Oct. 5, 1971     F. J. RYCHLIK     3,610,066
REINFORCED PLASTIC GEAR
Filed Nov. 3, 1969
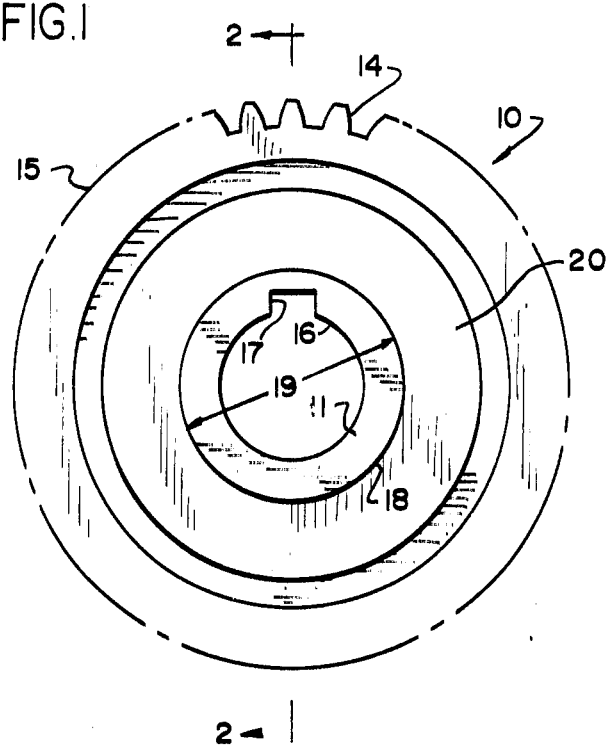
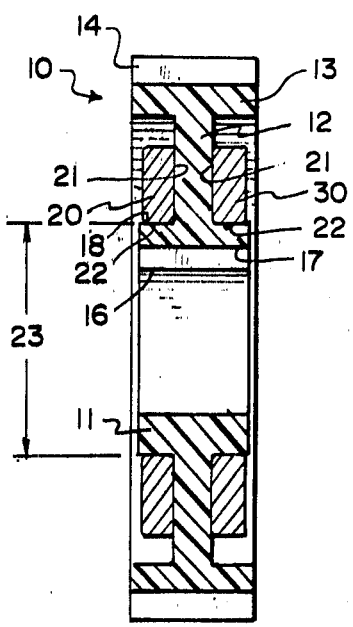
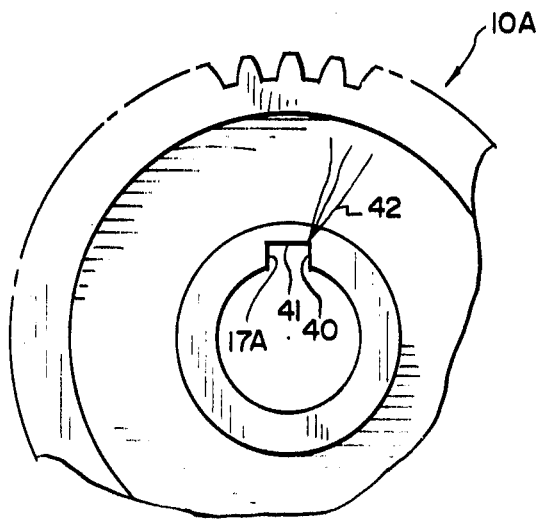
INVENTOR.
FRANK RYCHLIK
BY *Ray E. Snyder*
ATTORNEY.

United States Patent Office 3,610,066
Patented Oct. 5, 1971

3,610,066
REINFORCED PLASTIC GEAR
Frank J. Rychlik, 3484 Whirlaway Drive
Northbrook, Ill. 60062
Filed Nov. 3, 1969, Ser. No. 873,169
Int. Cl. F16h 55/04, 55/30
U.S. Cl. 74—434
4 Claims

ABSTRACT OF THE DISCLOSURE

A molded plastic gear or drive wheel having its hub reinforced under compression with metal rings or washers to prevent cracking at the splines or keyway.

BACKGROUND OF THE INVENTION

(1) Field of the invention

This invention relates to machine elements and mechanisms and more particularly to gearing or other rotatable torque transmitting device molded from plastic or other relatively soft material and reinforced after molding to prevent cracking at its hub.

(2) Description of the prior art

Plastic gears are well known in the art. They have the advantage of being far cheaper to produce in large quantities by a molding operation than metal gears of the same size that are hobbed or cut. They have the disadvantage of being limited in the torque they can transmit or the shock loads they are capable of absorbing because of their relatively weak strength of material. The plastic material of which the gears are molded may generally be quite strong in withstanding compression stresses but weak in resisting tension or shear stresses. The platic gears frequently crack at points where the shear stresses are concentrated such as at the keyway groove in the hub.

SUMMARY OF THE INVENTION

It is an object of the present invention to provide a molded plastic gear that is reinforced and compressed after molding by a metal ring or rings at certain critical points to increase its strength and thereby extend its range of useful applications. The metal ring or washer is pressed on the hub of the gear to form a composite structure that is intermediate in cost and usefulness between the bare plastic gear and a comparable metal gear.

It is another object to provide a reinforcing structure for a plastic gear or similar device that is effective to convert shear stresses acting at particular points on the hub of the gear into compression stresses that are distributed over substantially all of the hub of the gear. Pressing the reinforcing ring or washer on the gear after molding prestresses the hub and any localized stresses that may occur at the splines or keyway are contained by the ring and tend to increase the compression on the hub.

For the purposes of this invention, a keyway may be considered as a unitary form of spline for attaching a gear or other rotatable mechanism to a shaft to form a torque transmitting connection.

BRIEF DESCRIPTION OF THE DRAWINGS

FIG. 1 is a plan view of the gear and reinforcing structure of the present invention;

FIG. 2 is a sectional view taken on line 2—2 of FIG. 1; and

FIG. 3 is a fragmentary plan view of a plastic gear without the reinforcing structure.

DESCRIPTION OF THE PREFERRED EMBODIMENT

The plastic gear of the present invention is designated generally by the numeral 10 and the reinforcing ring by the numeral 20.

The gear 10 comprises a hub 11, a web 12, and a rim 13. Gear teeth 14 are formed on the outer periphery 15 of the rim 13. The hub 11 is formed with an internal cylindrical axial bore 16, a longitudinally extending keyway 17 and an outer cylindrical surface 18 adjacent the web 12. The web 12 interconnects and is molded integrally with the hub 11 and the rim 13.

The reinforcing ring 20 may be in the shape of a washer and has an end surface 21 which may abut the web 12 and an internal cylindrical surface 22 which engages the surface 18 of the hub 11. The ring 20 preferably may be made of steel or other suitable material and its internal diameter 23 preferably is approximately .002 inch smaller than the outer diameter 19 of the hub 11. This example is for an assumed hub diameter of approximately 1¼ inches. The differential in diameters should be roughly proportional to the overall hub diameter of other sized hub reinforcements. The ring 20 is pressed on the hub 11 by a suitable pressing operation and this operation prestresses the hub 11 and retains the ring 20 in place thereafter.

For many applications, a single ring 20 may be sufficient, but when desired, an identical companion ring 30 may be pressed on the hub 11 on the opposite side of the gear 10.

Referring to FIG. 3, a plastic gear 10A that is not reinforced in the manner of the present invention is shown. Torque transmitted through the gear creates stresses within its material which is concentrated at points of sharp transition such as between the sides 40 and the bottom 41 of the keyway groove 17A. Such stresses may cause the hub to crack as shown at 42, and such cracks tend to migrate through the material along the paths of least resistance. Eventually, the gear 10A is damaged beyond repair.

The presence of the reinforcing ring 20 on the hub 11 confines any localized stresses within the hub 11 and prevents the hub from being distorted in shape to the point where cracks can occur. Considerably greater torque can therefore be transmitted through the gear 10 without damaging it.

The embodiment shown and described is by way of example only and it is contemplated that changes may be made thereto without departing from the spirit of the invention. The invention is not considered to be limited to the embodiment shown except insofar as the claims may be so limited.

I claim:

1. A reinforced composite structure adapted to perform a torque transmitting function in a mechanism and comprising:

a molded plastic circular body formed with a cylindrical hub; and a reinforcing ring or washer pressed on said hub after molding so as to prestress said hub and contain stresses developed therein within said ring.

2. The composite structure of claim 1 wherein said hub is formed with an axial central bore and a spline or keyway for attachment to a rotatable shaft.

3. The composite structure of claim 2 wherein said body is formed on its outer periphery with gear teeth.

4. The composite structure of claim 1 wherein the outer diameter of said hub is slightly larger than the inner diameter of said ring prior to pressing said ring on said hub.

References Cited

UNITED STATES PATENTS

| | | | |
|---|---|---|---|
| 2,785,580 | 3/1957 | Andrews | 74—432 |
| 2,976,741 | 3/1961 | Martin | 74—432 |
| 3,289,487 | 12/1966 | Weedfall | 74—214 |

LEONARD H. GERIN, Primary Examiner

U.S. Cl. X.R.

74—243, 432